(12) United States Patent  
Bürkle et al.

(10) Patent No.: US 7,232,003 B2
(45) Date of Patent: Jun. 19, 2007

(54) MOTOR VEHICLE WITH LOWERABLE DRIVE UNIT

(75) Inventors: Jürgen Bürkle, Fellbach-Schmiden (DE); Timo Schmidt, Stuttgart (DE); Karsten Unger, Stuttgart (DE)

(73) Assignee: Daimler Chrysler AG, Stuttgart (DE)

( * ) Notice: Subject to any disclaimer, the term of this patent is extended or adjusted under 35 U.S.C. 154(b) by 499 days.

(21) Appl. No.: 10/875,609

(22) Filed: Jun. 23, 2004

(65) Prior Publication Data

US 2005/0082102 A1    Apr. 21, 2005

(30) Foreign Application Priority Data

Jun. 24, 2003  (DE) ................. 103 28 170

(51) Int. Cl.
*B60K 28/14* (2006.01)

(52) U.S. Cl. ................. 180/274; 180/291; 180/294

(58) Field of Classification Search ......... 180/291, 180/294, 274, 271; 280/784
See application file for complete search history.

(56) References Cited

U.S. PATENT DOCUMENTS

| 3,578,782 | A | * | 5/1971 | Miyoshi | 180/232 |
| 5,076,389 | A | * | 12/1991 | Goor | 180/232 |
| 5,476,151 | A | * | 12/1995 | Tsuchida et al. | 180/274 |
| 5,477,938 | A | * | 12/1995 | Tsuji et al. | 180/274 |
| 6,394,215 | B1 | * | 5/2002 | Masuda | 180/232 |
| 6,761,242 | B2 | * | 7/2004 | Yoshida et al. | 180/298 |
| 7,040,446 | B2 | * | 5/2006 | Anzai et al. | 180/312 |

FOREIGN PATENT DOCUMENTS

JP         5-338445    * 12/1993  ............. 180/271

* cited by examiner

*Primary Examiner*—Eric Culbreth
(74) *Attorney, Agent, or Firm*—Klaus J. Bach

(57) ABSTRACT

In a motor vehicle comprising a vehicle body having a support structure for supporting a main drive unit and at least one support block disposed on the support structure by which the main drive unit is supported in the vehicle body, each support block comprises bottom and top parts which are movable relative to each other and provided with an operating mechanism for causing such movement for lowering the drive unit when the motor vehicle is involved in a collision.

5 Claims, 1 Drawing Sheet

MOTOR VEHICLE WITH LOWERABLE DRIVE UNIT

BACKGROUND OF THE INVENTION

The invention relates to a motor vehicle a drive unit supported by the vehicle body by means of at least one drive unit support block.

In motor vehicles, the position of the motor or drive unit, which is generally a piston-type internal combustion engine unit, is tightly coupled with the position of the transmission or other peripheral systems (oil supply, cooling system, air conditioning system, etc.).

At the same time, the area of the vehicle body provided for the drive unit (engine compartment) is usually very tight so that there is only limited available space. Accordingly, the position of the drive unit is essentially predetermined with only a small space between the drive unit and the engine compartment hood thereabove. In present passenger cars, this distance is generally not more than twenty five millimeter. As a result, during a collision of the motor vehicle with a person, there is only very little deformation clearance for the hood so that the potential for injuries to a person in an accident is relatively high.

It is the object of the present invention to provide, with simple means, a motor vehicle with an increased safety potential during a collision particularly with a person (pedestrian) while, at the same time, ensuring a space-saving arrangement of the drive unit in the vehicle body.

SUMMARY OF THE INVENTION

In a motor vehicle comprising a vehicle body having a support structure for supporting a main drive unit and at least one support block disposed on the support structure by which the main drive unit is supported in the vehicle body, each support block comprises bottom and top parts which are movable relative to each other and provided with an operating mechanism for lowering the drive unit when the motor vehicle is involved in a collision.

Under normal operation, the support block is in a normal position so that also the drive unit is in its normal operating position. However, in case of a collision of the vehicle with a person the support block is lowered by an operating mechanism, wherein preferably the top part of the support block is vertically lowered. Accordingly the drive unit, which is mounted onto the support block is lowered and/or pivoted out of its operating position. One or several such support blocks may be provided. Furthermore the drive unit may at the same time be uncoupled from the rest of the drive (for example, the transmission or a coupling may be provided between the drive unit and the transmission which tolerates the pivoting of the drive unit relative to the transmission). By the lowering of the drive unit the distance between the body part above the drive unit and the drive unit is increased so that also an increased deformation zone is obtained.

In the arrangement according to the invention, the operating mechanism comprises a hydraulic or pneumatic actuator. The actuator includes a pressure chamber for maintaining the normal position of the support block so that, in case of a collision, the pressure in the pressure chamber can be rapidly released for lowering the top part relative to the bottom part of the support block. Alternatively, the support parts can be moved relative to one another also by an increase of the hydraulic or pneumatic pressure. Preferably, the actuator includes a sensor for detecting a collision, for example, a collision pressure sensor arranged on a vehicle body component (the hood) above the drive unit. Pneumatic and/or hydraulic systems have the advantage that the position change of the support can be made reversible (Restitution of the original condition). Furthermore, they may act as dampers during normal operation of the vehicle.

In another embodiment of the invention, the operating mechanism includes an electric and/or pyrotechnical actuator. Such solutions can be provided in a particularly simple manner. The support block then includes preferably a destructible intermediate element disposed between the top and bottom parts of the support block. Because of gravity forces, the top part drops down when the intermediate part is destroyed; the drive unit mounted onto the top part is correspondingly lowered. Alternatively, the support parts can be displaced relative to one another also by an electrically or pyrotechnically generated pressure increase. Also in this case, the actuator is preferably provided with a sensor for detecting a collision, for example a collision pressure sensor mounted on a vehicle body component disposed above the main drive unit.

In a further embodiment of the invention, the support is adjustable vertically. In this way, a particularly large position adjustment path in vertical direction can be obtained so that the drive unit can be lowered as deep as possible. In the usual horizontal position of the motor vehicle, the gravity forces can be used to the maximum extent (maximum acceleration) for lowering the main drive unit of the vehicle.

In still another embodiment of the invention, the drive unit is moved during a collision of the motor vehicle downwardly by a position adjustment of the support so that again a relatively large distance from the vehicle body part above is obtained during a collision.

The vehicle body part is generally the front hood of the motor vehicle. The vertical adjustment capability of the motor hood relative to the main drive unit is generally less than 35 mm; the adjustment distance of the support is more than 5 mm and preferably more than 10 mm. In this way, a space saving installation of the main drive unit in the engine compartment can be achieved with a deformation zone for the vehicle body part (hood) above the drive unit which is sufficiently large to provide some security for a pedestrian when impacted by a motor vehicle.

The invention will become more apparent from the following description of an embodiment thereof on the basis of the accompanying drawings.

BRIEF DESCRIPTION OF THE DRAWINGS

The sole FIGURE shows schematically the arrangement of an internal combustion engine disposed transversely in a motor vehicle.

DESCRIPTION OF A PARTICULAR EMBODIMENT

Figure 1:
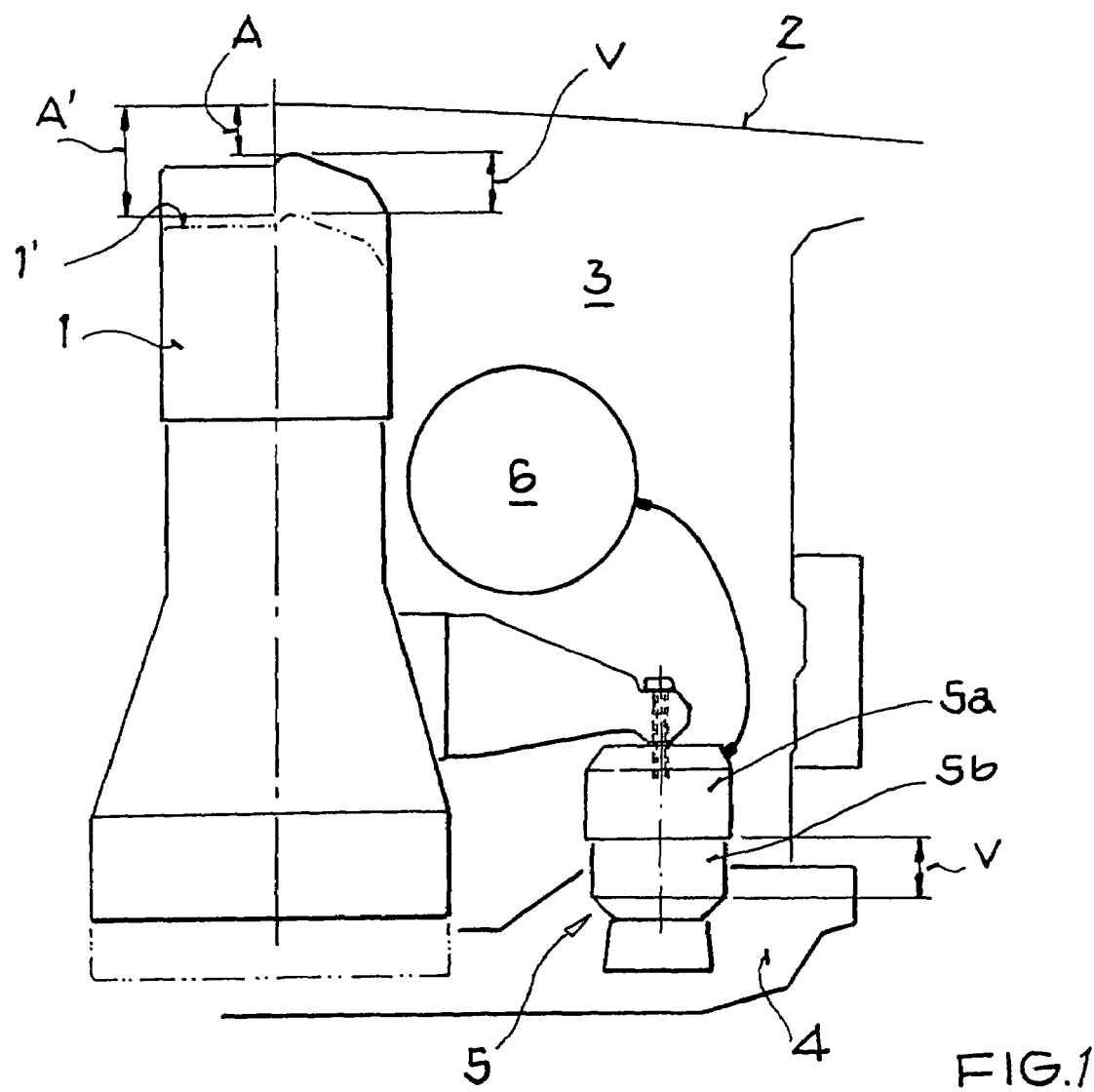

The arrangement shown concerns a motor vehicle in the form of a passenger car with a main drive unit shown as an internal combustion engine 1 installed in the front of the vehicle body. The main drive unit 1 is for example an inline six cylinder engine mounted transversely in the area of the front axle of the vehicle. The invention may of course also be used in connection with longitudinally installed engines.

Above the internal combustion engine a body element is disposed that is generally a motor hood 2 which covers an engine compartment 3. In addition, further capsules and/or covers (not shown) may be provided between the motor hood 2 and the engine 1. Between the engine 1 and the motor hood 2, there is a certain distance A, which is provided to accommodate on one hand a certain space for relative movements between the engine and the vehicle body part and, on the other hand, to provide a zone for accommodating deformations of the motor hood during a collision of the vehicle (particularly the hood) with a smaller movable part or a person. Generally, the distance A is about 25 or less than 35 mm.

The engine 1 transmits its drive energy to a torque converter unit which is not shown but which is coupled to the driven shaft of the motor vehicle. The torque converter unit is a fully automatic transmission and coupled to the internal combustion engine 1. Alternatively, a normal or a semiautomatic transmission may be provided. The coupling between the engine and the transmission preferably includes a safety braking element and/or an angle adjustment element.

As apparent from the FIGURE, the engine 1 is mounted by a support 5 on a vehicle body support structure 4. The support block 5 comprises a top part 5a and a bottom part 5b which are movable relative to one another by a distance V. The support block 5 comprises a hydraulic and/or electric or pneumatic actuator 6 and a sensor which is not shown.

The actuator 6 provides for a movement of the support block top part 5a, preferably by supplying energy, such that the top part is moved downwardly onto the bottom part 5b utilizing gravity effects. Together with the support top part 5a also the engine 1 is moved or pivoted downwardly. Such action is initiated in accordance with the invention when (for example detected by the sensor), the motor vehicle collides with a person, a motorcycle or another object. A hydraulic actuator, however, could also be used under normal vehicle operating conditions for an adaptive control of the support block 5 (for example, vibration dampening). Furthermore, with a hydraulic actuator, the original state of the support block 5 could be reestablished when, after an accident, this should become necessary.

Preferably all the support blocks of the engine 1 are like the support block 5 and preferably all are controlled by a common actuator. In that case, all support blocks are actuated in the same way resulting in a linear lowering movement of the engine from its normal operating position by the displacement length V, which is added to the distance A already existing between the engine and body element 2. As a result, an increased distance A' is obtained when the engine 1 is in its lowered position (dashed line 1').

The displacement length V represents an additional degree of freedom for the selection of the position of the engine within the vehicle body. The distance A may be selected smaller than in motor vehicles without support blocks according to the invention. With the arrangement according to the invention, the distance between the engine and the hood disposed above the engine can be increased in case of a collision by the displacement length V. Accordingly, the gravity of the engine during normal engine operation can be positioned higher that is the distance A can be smaller than in the state of the art of motor vehicles or a larger deformation area is available for the motor hood during an accident.

In a further modified embodiment, a destructible intermediate element is disposed between the top part and the bottom part of the support block. Because of gravity forces, the top part of the support blocks drops downwardly when the intermediate element is destroyed. As a result, the engine supported on the top part is lowered correspondingly. Alternatively, the parts of the support block can be moved relative to each other also electrically or by a pyrotechnically generated pressure. Also, in this case, the actuator is provided with a sensor for detecting a collision for example an impact sensor which is mounted on the hood above the engine.

The displacement length V represents an additional degree of freedom for the selection of the position of the engine within the vehicle body. The distance A may be selected smaller than in motor vehicles without support blocks according to the invention. With the arrangement according to the invention, the distance between the engine and the hood disposed above the engine can be increased in case of a collision by the displacement length V. Accordingly, on one hand, the center of gravity of the engine during normal engine operation can be higher that is the distance A can be smaller than in the state of the art motor vehicles and, on the other hand, a larger deformation area for the motor hood is available during an accident.

With the arrangement according to the invention, an active displacement of the motor by the motor vehicle is possible which—in contrast to motor hoods, which open automatically—includes components which move away from a person colliding with a motor vehicle.

What is claimed is:

1. A motor vehicle comprising a vehicle body having a support structure for supporting a main drive unit, at least one support block disposed on said support structure, with said main drive unit being supported on said at least one support block, said at least one support block including bottom and top parts which are movable relative to each other, and an operating mechanism for causing movement of said bottom and top parts relative to each other when said motor vehicle is involved in a collision, said operating mechanism comprising one of a hydraulic, a pneumatic, an electrical and a pyro-technical actuator.

2. A motor vehicle according to claim 1, wherein said bottom and top parts of each support block are movable relative to each other in a vertical direction.

3. A motor vehicle according to claim 2, wherein, during a collision of said motor vehicle, the top part of the support block supporting said main drive unit is moved downwardly for lowering the main drive unit.

4. A motor vehicle according to claim 1, wherein said vehicle body comprises a motor hood arranged above said main drive unit with a gap therebetween in vertical direction of less than 35 mm and said bottom and top parts of said at least one support block are movable relative to each other in vertical direction by at least 5 mm.

5. A motor vehicle according to claim 4, wherein said top part is movable relative to said bottom part by more than 10 mm.

* * * * *